Figure 1:
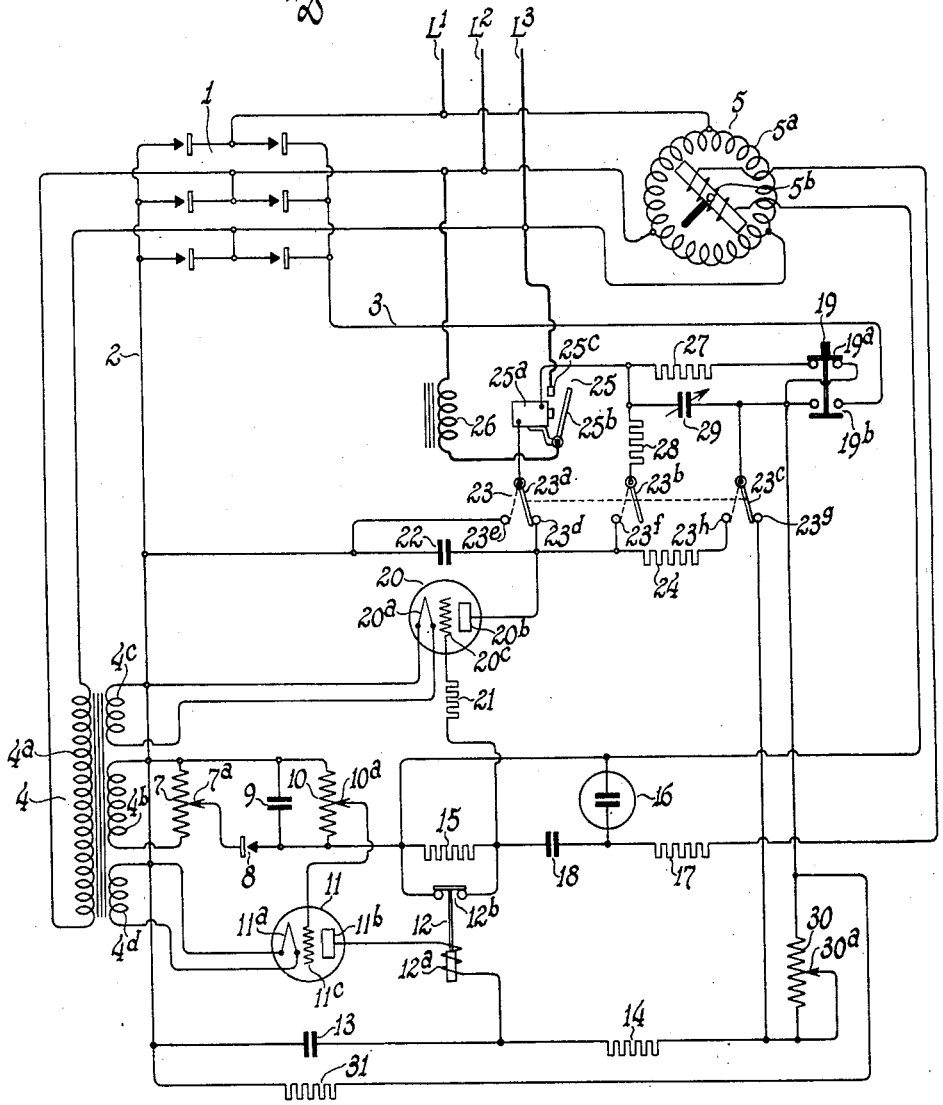

Feb. 14, 1939.  C. STANSBURY  2,146,863
TIMING CONTROL
Filed Aug. 15, 1936

Inventor
Carroll Stansbury
By Frank H. Hubbard
Attorney

Patented Feb. 14, 1939

2,146,863

UNITED STATES PATENT OFFICE 2,146,863

TIMING CONTROL

Carroll Stansbury, Wauwatosa, Wis., assignor to Cutler-Hammer, Inc., Milwaukee, Wis., a corporation of Delaware Application August 15, 1936, Serial No. 96,195

19 Claims. (Cl. 175—375)

This invention relates to an electric welding system or the like and particularly to a system in which alternating welding current is supplied for a very short period, which period may be adjusted over a very wide range, that is, from a period corresponding to approximately one cycle of the alternating welding current to 15 or more cycles, and it is the object of the present invention to provide a control adapted for adjustment over such a wide range.

Another object of the invention is to provide novel means for accurately timing periods of current supply to a translating device of extremely short duration.

Another object is to provide a controller in which the supply of current to a circuit is started and/or stopped at a selected moment of an alternating current cycle.

Another object is to provide a controller which supplies an accurately measured amount of energy to an electromagnetic switch which completes a translating circuit to thus control the period during which the circuit is energized.

Another object is to provide a controller in which energy is supplied to an electromagnetic switch at an accurately determined moment of a cycle of the alternating current controlled by the switch.

Another object is to provide a control voltage for an electron tube having a very rapid rate of change in magnitude.

Other objects and advantages will hereinafter appear.

In the resistance welding art, it is common practice to commutate the primary circuit of a welding transformer whose secondary furnishes the welding current by means of a magnetically operated contactor. This contactor usually employs an alternating current magnet, because usually only alternating current is available, and because the speed of response of such magnets renders them most suitable for such service. On the other hand, the speed of closing of a direct current contactor can be increased by using a coil of few turns and low resistance and connecting such a coil directly across the line only during the closing period and subsequently inserting sufficient resistance in series therewith to reduce the continuously flowing current to permissible values. Such practice involves the use of an auxiliary contact which requires accurate adjustment and may give trouble due to arcing.

The present invention avoids these difficulties by the use of a condenser of large capacity connected in series with the contactor coil. A resistor may or may not be connected in parallel with said condenser depending on whether it is desired to keep the contactor energized and closed after initial closure or whether only momentary closure is required.

In the operation of magnetic contactors for commutating welding circuits, it has heretofore been the practice to permit the main contacts to open at random relative to the phase of the controlled alternating current. It is well known that the arcing on the contacts under such conditions varies widely depending on the instantaneous value of the current at the moment of their separation. It is herein proposed to control this moment so as to cause a minimum of arcing, thereby increasing contact life and improving the uniformity of the results by the elimination of variations due to arc current.

It is proposed to obtain such synchronous operation of the contactor by controlling its magnet coil through an electron tube, the control electrode of which is controlled synchronously with the welding current. This requires a supply of direct current for the coil circuit to insure uniform energization at any desired instant of energization of the contactor coil within 360 electrical degrees of the alternating welding voltage. The present arrangement therefore includes a rectifier or other direct current source for supplying the coil circuit and also includes means for rapid and accurate energization of the contactor by direct current.

A further feature of the present system employing a large condenser in circuit with the contactor coil resides in the fact that by proper selection of the circuit constants the circuit may be given an oscillatory tendency, such that were it not for the presence of the electron tube in the circuit, the current and flux in the coil would reverse several times with decreasing amplitude. The presence of the electron tube in circuit with the coil, however, permits current flow only during the first half cycle of what would otherwise be a series of damped oscillations. Such a single pulse of current may be employed to energize the contactor for an extremely brief and accurately controlled period. Alternatively, a resistor may be connected in parallel with the condenser to permit holding the contactor energized for periods longer than are readily obtainable by the method employing the single half oscillation of current.

The following specification and the accompanying drawing are illustrative of one embodiment of my invention.

Figure 2:
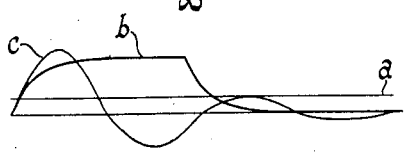

Figure 1 illustrates diagrammatically a controller embodying my invention, while Fig. 2 is a diagram which explains certain phenomena of an electrical circuit.

L¹, L² and L³ are the terminals of a three-phase alternating current supply source to which is connected in a well known manner a double wave star-connected rectifier 1 for supplying the bus bars 2 and 3 with direct current although it will be understood that these bus bars may be supplied with direct current from some other source. A transformer 4 has a primary winding 4ª connected to the lines L² and L³ of the alternating current source. A phase shifting transformer 5 has a three-phase primary winding 5ª connected to the three terminals of the alternating current supply and a single phase secondary winding 5ᵇ which supplies an alternating voltage which as is apparent can be adjusted in phase relative to a voltage of the supply source as, for instance, the voltage impressed upon the primary winding 4ª by rotation of the secondary winding 5ᵇ.

A secondary winding 4ᵇ of the transformer 4 supplies a voltage divider 7 with energy. Said voltage divider is provided with an adjustable contact 7ª and a condenser 9 is connected between one terminal of said voltage divider and the contact 7ª in series with a half wave rectifier 8. The condenser is paralleled by a second voltage divider 10 having an adjustable contact 10ª. The common terminal of the winding 4ᵇ and the voltage dividers 7 and 10 is connected to the bus bar 2 and the adjustable contact 10ª is connected to the grid 11ᶜ of a gaseous electron discharge tube 11, having a cathode 11ª and an anode 11ᵇ. The cathode 11ª is also connected to the bus bar 2 so that the voltage existing between said bus bar and the adjustable contact 10ª is impressed between said grid and the cathode. The cathode 11ª is heated by current supplied by a secondary winding 4ᵈ of the transformer 4, but said cathode may be heated in any other well known manner. The anode 11ᵇ is connected to one terminal of a winding 12ª of a relay 12, the other terminal of said winding being connected to the common terminal of a condenser 13 and a resistor 14. The relay 12 is also provided with normally closed contacts 12ᵇ which are bridged by a resistor 15.

The secondary winding 5ᵇ of the phase shifting transformer 5 has connected in circuit therewith the gaseous tube 16 in series with a resistor 17, and a condenser 18 is inserted between the common terminal of the tube 16 and the resistor 17 and one side of the contact 12ᵇ, the other side of said condenser being connected to that terminal of the winding 5ᵇ which is directly connected to the tube 16. Said last mentioned terminal is also connected to the common terminal of the rectifier 8, the condenser 9 and the resistor 10.

The controller also comprises a pilot switch 19 having normally closed contacts 19ª and normally open contacts 19ᵇ. This pilot switch may be either manually or foot operated or it may be operated by a hydraulic system which actuates the welder.

A gaseous electron discharge tube 20 is provided with a cathode 20ª, an anode 20ᵇ and a grid 20ᶜ. The cathode 20ª is supplied with heating current from a secondary winding 4ᶜ of the transformer 4, said cathode being also connected to the bus bar 2. The grid 20ᶜ is connected through a resistor 21 to the common terminal of the resistor 15 and the condenser 18. A condenser 22 is connected across the cathode 20ª and the anode 20ᵇ. A triple pole, double throw switch 23 is provided with double throw contact blades 23ª, 23ᵇ and 23ᶜ. The contact blade 23ª in the right hand position engages the contact 23ᵈ and the contact blade 23ᶜ engages the contact 23ᵍ. When thrown to the left the contact blade 23ª engages the contact 23ᵉ, the blade 23ᵇ engages the contact 23ᶠ and the blade 23ᶜ engages the contact 23ʰ. The anode 20ᵇ is also connected to the contacts 23ᵈ and 23ᶠ, while a resistor 24 is connected between the anode 20ᵇ and the contact 23ʰ. The contact arm 23ª is connected to the winding 25ª of a switch 25 which has a movable contact arm 25ᵇ engaging a stationary contact 25ᶜ. This switch 25 connects the primary winding 26 of the welding transformer to the alternating current source which supplies the terminals L¹, L² and L³. However, another alternating current source may supply the welding current, provided that this source is in synchronism with the source furnishing the alternating control current.

The second terminal of the winding 25ª is connected to one end of a resistor 27, and through a resistor 28 to the contact blade 23ᵇ, and through an adjustable condenser 29 to the blade 23ᶜ. The common terminal of the condenser 29 and the coil 25ª is connected through the resistor 27 to one side of the normally closed contact 19ª, the other side of which is connected to the blade 23ᶜ and is also connected to one side of the normally open contact 19ᵇ, the other side of said normally open contact being connected to the bus bar 3. A resistor 30 is connected between the blade 23ᶜ and the contact 23ᵍ. The resistor has an adjustable contact 30ª which is directly connected to the contact blade 23ᵍ so that an adjustable amount of said resistance may be short circuited. A further resistor 31 is connected between the bus bar 2 and the blade 23ᶜ.

The apparatus functions in the following manner. If it is desired to operate with a very short cycle, the blades of the switch 23 are moved to the right and energy is supplied to the lines L¹, L² and L³. The alternating current is rectified through the rectifier 1 and supplies the bus bars 2 and 3 with direct current, the bus bar 2 being charged negatively and the bus bar 3 positively. Alternating current is further supplied to the primary windings of the transformers 4 and 5. When the transformer 4 is energized, the secondary windings 4ᶜ and 4ᵈ furnish heating energy to the cathodes 20ª and 11ª respectively.

If now the pilot switch 19 is operated and the contact 19ᵇ is closed, the direct current potential existing between the bus bars 2 and 3 is impressed upon the circuit comprising the tube 20, switch blade 23ª, coil 25ª and condenser 29. However, no current can flow through the circuit because the grid 20ᶜ of the tube 20 is more negative than the critical grid potential. This grid bias is obtained in the following manner. A suitable alternating potential is induced in the secondary winding 4ᵇ and a part of this alternating potential, determined by the position of the contact 7ª of the voltage divider 7, is impressed upon the rectifier 8 and condenser 9 so that the condenser is charged to a unidirectional potential which potential is impressed upon the grid 20ᶜ, the polarity of the rectifier being such that the potential of the grid is negative and of a value sufficient normally to block the tube 20. The other side of this grid circuit is directly connected to the bus bar 2 to which also the cathode 20ª is connected.

The closure of the contacts 19ᵇ furthermore closes a circuit from the positive bus 3 through switch blade 23ᶜ, the resistor 14, condenser 13 to the negative bus 2. It will be observed that the tube 11 has its cathode and anode connected in series with the coil 12ᵃ across the condenser 13. The grid 11ᶜ of this tube is held at a negative potential from the transformer coil 4ᵇ through the voltage divider 10 in such a manner that preferably a fraction of the voltage to which the condenser 9 is charged is impressed upon the grid 11ᶜ. If now the condenser 13 is charged, it reaches a charge which impresses momentarily a plate voltage on the tube 11 for which the existing grid potential cannot block the tube and which thus permits conduction of the tube and passage of current through the relay coil 12ᵃ and the relay attracts its plunger and opens the contacts 12ᵇ. The opening of the contacts 12ᵇ inserts the resistance 15 in series with the condenser 18 across the gaseous tube 16. The transformer winding 5ᵇ impresses an alternating voltage on the tube 16, which, when the voltage is high enough during the cycle, causes conduction of the tube and a resultant current flow therethrough. This current flow varies the charge on the condenser 18 which is modified through the resistor 15 in such a manner that a very steep voltage wave is produced by the condenser as the polarity of the alternating voltage impressed upon it reverses. It will be noticed that the opening of switch 12ᵇ superimposes this voltage upon the voltage impressed upon the grid 20ᶜ by the charge on condenser 9, so that when the peak voltage obtains, the grid potential of tube 20 becomes positive and current flows through tube 20. This initiates current flow through the winding 25ᵃ and the condenser 29 which is thus charged. After the condenser 29 has been charged in the manner aforedescribed, current flow ceases and the switch 25, which, upon initiation of current flow, closes the circuit to the welding transformer 26, opens the contacts again and disconnects the transformer. No further operation of switch 25 can take place as long as the pilot switch 19 maintains the contact 19ᵇ closed, but upon release of the pilot switch 19, contact 19ᵇ is opened and contact 19ᵃ is closed so that now the condenser can discharge but the opening of contact 19ᵇ also opens the current supply for the tube 11 and relay 12 closes the contact 12ᵇ and no peak voltage can be impressed upon the grid 20ᶜ. As a result, the tube 20 will not again become conducting until the switch 19 is operated to closing position as aforedescribed.

The moment at which the aforementioned peak voltage is sufficient to start conduction of the tube 20 may be varied by rotating the coil 5ᵇ of the regulator 5.

Attention is called to the condenser 22 which is connected across the tube 20 in order to prevent premature conduction of said tube, as it has been found that the application of voltage to the tube upon the closure of the switch 19ᵇ causes a very steep voltage gradient which may cause this tube to conduct prematurely in spite of the high negative voltage of the grid 20ᶜ.

The resistor 31 provides for the discharge of the condenser 13 after the switch 19ᵇ is opened, while the resistor 14 which is in series with the condenser 13 provides for a slight delay in the rise of the voltage of the condenser and the subsequent conduction of tube 11 after the closure of the switch 19ᵇ. The purpose of this arrangement is to insure that the contact 19ᵇ is securely closed and any vibrations of said contact incident to the closing movement have stopped before the timing period starts.

The period during which the welding circuit is energized may be adjusted by adjustment of the capacity of the condenser 29. It will thus be seen that by varying this period and by accurately determining the moment at which the switch 25 is energized the amount of energy which is sent through the welder may be accurately determined while arcing of the contacts of the welder switch 25 incident to the opening of the circuit may be greatly reduced by properly timing the closing moment so that the alternating welding current just passes through zero at the moment of the separation of the contacts.

For timing periods greater than a relatively small number of cycles the switch 23 is thrown to the left. Under these conditions the coil of switch 25 is directly in series with the condenser 29 which latter is paralleled by the resistors 28 and 24. When the pilot switch contact 19ᵇ is closed, current flows through the welding contactor coil 25ᵃ, condenser 29 being of a capacity to permit flow of a sufficient inrush current through the coil to pick up and close its contact while the resistors 28 and 24 subsequently permit a sufficient flow of current around the charged condenser to keep the coil closed. The switch 25 then stays closed until the grid 20ᶜ of tube 20 becomes sufficiently positive to permit the tube to conduct, the tube current flowing from bus bar 2 through the tube 20, the resistor 24 and switch 19ᵇ to bus bar 3. Thus the tube is in parallel with the coil 25ᵃ, the additional voltage drop through the resistor 24 being sufficient to cause the coil 25a to be de-energized and thus open the welder circuit.

The control of the grid potential of the tube 20 is similar to that aforedescribed for short period operation with the exception that the condenser 13 is now charged through the resistor 30, which resistor is adjustable and of such value that the condenser 13 is charged to a sufficiently high potential to cause conduction of the tube 11 as aforedescribed only after the expiration of a period starting with the closure of switch 19ᵇ corresponding to the total welding time desired. Thus, by varying the adjustment of the resistor 30, the welding period can be accurately determined, and by varying the position of the coil 5ᵇ of the regulator 5, the moment at which the switch 26 opens may be made to coincide with the passage of the welding current through zero.

After the tube 20 has started conducting it continues to conduct and prevent the switch 25 from reclosing until the pilot switch 19ᵇ is opened again and the current supplied to the tube is thus interrupted.

What I claim as new and desire to secure by Letters Patent is:

1. In combination with an electric circuit, an electromagnetic switch having an energizing coil, a condenser connected in series with said coil and affording a rapidly rising initial current flow through said coil, means for starting and stopping said current flow affording a relatively long period and a relatively short period for said flow selectively, said means including means to control the moment of starting current flow for one type of period and the moment of stopping current flow for another type of period.

2. In combination with an electric circuit, an electromagnetic switch having an energizing coil, a condenser connected in series with said coil and affording a rapidly rising initial current flow through said coil, means for starting and stopping said current flow affording a relatively long period and a relatively short period for said flow selectively, said means including means to control the moment of starting and to regulate the duration of current flow for one type of period and means to regulate the duration and control the moment of stopping current flow for another type of period.

3. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, an electron tube having a control element, a circuit including said supply, said condenser, said coil and said tube, and means connected to said control element and said source for starting and stopping current flow in said circuit and affording a relatively long period and a relatively short period of flow, said means including means to control the moment of starting current flow at a given moment in the cycle of the alternating current for one type of period and the moment of stopping current flow for another type of period.

4. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, an electron tube having a control element, a circuit including said supply, said condenser, said coil and said tube, and means connected to said control element and said source for starting and stopping current flow in said circuit and affording a relatively long period and a relatively short period of flow, said means including means to control the moment of starting current flow at a given moment in the cycle of the alternating current and to regulate the direction of current flow for one type of period and means to regulate the duration and control the moment of stopping current flow for another type of period.

5. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, an electron tube having a control element, a circuit including said supply, said condenser, said coil and said tube and means connected to said control element and said source to impress a voltage on said element for starting and stopping current flow in said circuit and affording a relatively long period and a relatively short period of flow, said means including means to control the moment of starting current flow at a given moment in the cycle of the alternating current for one type of period and the moment of stopping current flow for another type of period and further including means to provide for a rapid rate of change of said voltage at said respective moment.

6. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, an electron tube having a control element, a circuit including said supply, said condenser, said coil and said tube, and means connected to said control element and said source to impress a voltage thereon for starting and stopping current flow in said circuit and affording a relatively long period and a relatively short period of flow, said means including means to control the moment of starting current flow at a given moment in a given cycle of the alternating current and to regulate the direction of current flow for one type of period and means to regulate the duration and control the moment of stopping current flow for another type of period and further including means to provide for a rapid rate of change of said voltage at said respective moment.

7. In combination, an electric circuit, an electromagnetic control switch having an energizing coil, a condenser connected in series with said coil and affording a rapidly rising initial current flow through said coil, means for starting current flow through said coil, means to regulate the approximate duration of current flow and means to modify the effect of said last mentioned means and to effect stoppage of current flow at a given moment.

8. In combination, an alternating current circuit, an electromagnetic control switch therefor, an energizing circuit for said switch, and means to supply current to said energizing circuit and after a time element to interrupt it for release of said switch always coincident with a given time phase of the alternating current controlled thereby, said means including a condenser in series with said energizing circuit to effect a rapid rise in initial energizing current of said switch with consequent greater constancy of the time element.

9. In combination, an electric circuit, an electromagnetic switch having an energizing coil and a condenser connected in series with said coil, means to initiate current flow through said coil and said condenser and to charge the latter, means to cause continuation of current flow through said coil after completion of the charging of said condenser and to regulate the approximate duration of said latter flow, and means to modify the effect of said last mentioned means and to effect stoppage of current flow at a given moment.

10. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, a resistance connected in parallel to said condenser, a circuit including said supply, said coil and said condenser, means to close said circuit and energize said coil, an electron tube connected in parallel with said coil and having a control element, means to normally impress upon said element a voltage rendering said tube non-conducting, and means modifying said voltage to cause the tube to conduct current and to de-energize said coil after the lapse of a given period.

11. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, a resistance connected in parallel to said condenser, a circuit including said supply, said coil and said condenser, means to close said circuit and energize said coil, an electron tube connected in parallel with said coil and having a control element, means to normally impress upon said element a voltage rendering said tube non-conducting, and means modifying said voltage to cause the tube to conduct current and to de-energize said coil after the lapse of a given period, said last mentioned means including means to provide for a rapid rate of change of said voltage at the instant of modification thereof.

12. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, a resistance connected in parallel to said condenser, a circuit including said supply, said coil and said condenser, means to close said circuit and energize said coil, an electron tube connected in parallel with said coil and having a control element, means to normally impress upon said element a voltage rendering said tube non-conducting, and means modifying said voltage to cause the tube to conduct current and to de-energize said coil after the lapse of a given period, including means to modify said period so as to start conduction of the tube at a given moment of the cycle of said alternating current.

13. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, a resistance connected in parallel to said condenser, a circuit including said supply, said coil and said condenser, means to close said circuit and energize said coil, an electron tube connected in parallel with said coil and having a control element, means to normally impress upon said element a voltage rendering said tube non-conducting, and adjustable means modifying said voltage to cause the tube to conduct current and to de-energize said coil after the lapse of a given period.

14. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, a resistance connected in parallel to said condenser, a circuit including said supply, said coil and said condenser, means to close said circuit and energize said coil, an electron tube connected in parallel with said coil and having a control element, means to normally impress upon said element a voltage rendering said tube non-conducting, and adjustable means modifying said voltage to cause the tube to conduct current and to de-energize said coil after the lapse of a given period, including adjustable means to modify said period so as to start conduction of the tube at a given moment of the cycle of said alternating current.

15. In combination, a source of alternating current, a translating device, an electromagnetic switch for controlling current supplied by said source to said device and having an energizing coil, a supply of direct current, a condenser connected in series with said coil and affording a rapidly rising initial current flow through said coil, a resistance connected in parallel to said condenser, a circuit including said supply, said coil and said condenser, means to close said circuit and energize said coil, an electron tube connected in parallel with said coil and having a control element, means to normally impress upon said element a voltage rendering said tube non-conducting, and adjustable means modifying said voltage to cause the tube to conduct current and to de-energize said coil after the lapse of a given period, including adjustable means to modify said period so as to start conduction of the tube at a given moment of the cycle of said alternating current.

16. Means for producing a varying potential having a rapid rate of change, comprising a source of alternating voltage, a gaseous discharge path and a resistor in series with said source, a condenser and a second resistor connected in series with each other and in parallel with said path and adapted to have induced therein an electromotive force which is the derivative of the voltage variations across the discharge path.

17. In combination with an electron tube having a cathode and a control grid, a source of alternating voltage, a gaseous discharge path and a resistor in series with the source, a condenser and a second resistance connected in series with each other and in parallel with the path and means to impress between said grid and said cathode a counter-electromotive force induced in said condenser resulting from variations of the voltage across said path.

18. In combination, a gaseous discharge tube and a resistor adapted to be connected in series across an alternating voltage, a condenser and a second resistor series connected across said tube, said condenser being adapted to have induced therein a voltage resulting from the variations of the voltage across said tube.

19. In combination, a source of alternating voltage, an electron tube having a cathode and a control grid, a gaseous discharge tube and a first resistor connected in series across said source of alternating voltage, and a condenser and a second resistor series connected between the common terminal of said gaseous tube and said first resistor and said control grid, and connections adapted to impress the voltage across said second resistor resulting from the voltage variations across said gaseous tube between said grid and said cathode.

CARROLL STANSBURY.